Sept. 30, 1969     N. A. NELSON     3,469,453

FLUID SAMPLING APPARATUS

Filed Oct. 8, 1965     4 Sheets-Sheet 1

INVENTOR.
NORMAN A. NELSON,
BY Charles E. Lightfoot
ATTORNEY.

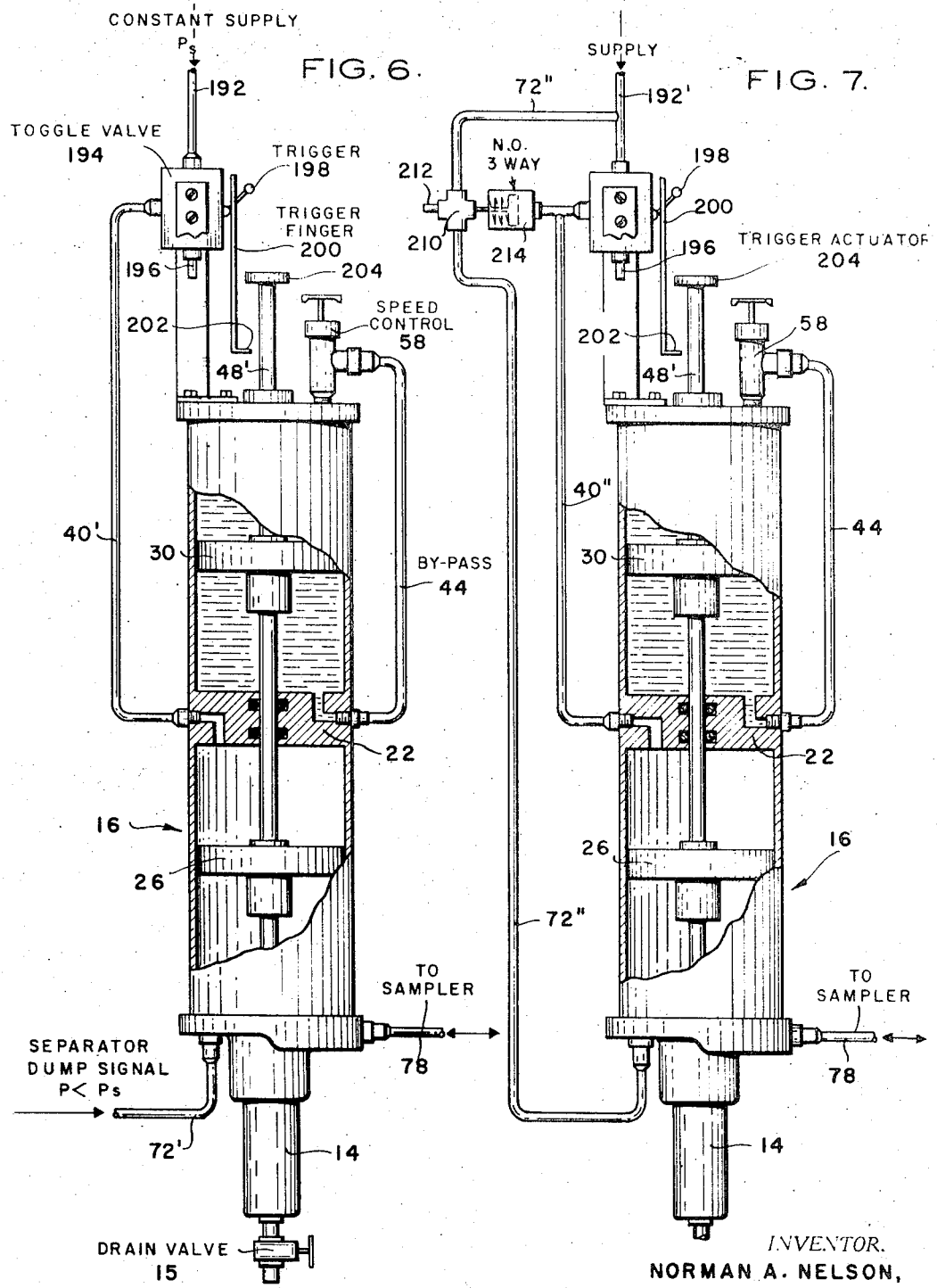

United States Patent Office 3,469,453
Patented Sept. 30, 1969

3,469,453
FLUID SAMPLING APPARATUS
Norman A. Nelson, P.O. Box 26595,
Houston, Tex. 77032
Filed Oct. 8, 1965, Ser. No. 494,013
Int. Cl. G01n 1/10
U.S. Cl. 73—422      8 Claims

ABSTRACT OF THE DISCLOSURE

Fluid sampling apparatus for taking a continuous sample of a flowing fluid and for the taking of a continuous sample during periods of flow of a fluid which flows intermittently and discontinuing the taking of the sample when no flow is taking place. The apparatus includes a sample taking cylinder and piston, means for moving the piston in one direction to take a sample and in the other direction to discharge the sample and means for regulating the rate of movement of the piston in the sample taking direction. Valving mechanism is provided by which sampling takes place during each period of intermittent flow and the sample is discharged upon the cessation of flow.

---

This invention relates to sample taking apparatus and more particularly apparatus for taking samples of a flowing liquid, and valve means for use therewith.

The invention may be employed for the taking of samples of numerous kinds of fluid materials and finds particular utility in the sampling of liquids, such as those encountered in the operation of oil wells and in the treatment and refining of such materials.

In the operation of various kinds of fluid handling and treating equipment, such as in the gathering of fluid from oil wells and the separation and metering of the oil therefrom, it is customary to take samples of the liquids for the purpose of checking the efficiency of the equipment or determining the composition or quality of the liquids. The accurate sampling of liquids in operations of this kind presents a number of difficulties due to variations which may take place from time to time in the composition or consistency of the liquid being sampled, and the procedure by which the samples are taken.

A basic problem encountered in the separation and metering of oil and water from oil wells as heretofore carried out, has been the necessity for the taking of a large number of samples to provide a truly representative sample of each dump. The maximum possible error in such a method of sampling is equal to one hundred divided by the number of samples taken. If ten samples are taken, for example, each time the meter dumps, a sampling error of 10% is possible. Thus, a composite sample made up of numerous samples taken at spaced intervals from a flowing liquid whose composition may vary substantially over a period of time, often does not accurately reflect the true condition of the liquid.

A method commonly employed heretofore in the taking of liquid samples makes use of equipment in which the sample is obtained from a flowing stream by outflow through an orifice or outlet under the influence of the pressure in the stream. In sample taking equipment of this kind the amount of the sample obtained is greatly affected by changes in the viscosity of the liquid being sampled. Thus, for example, where a sample of a well fluid is being taken in which separation of oil and water has taken place, more water may be obtained in the sample during the time that separated water is flowing past the sampling point than is represented in a sample of the unseparated well fluid. Similarly, less oil will be obtained in the sample during the time that separated oil is flowing past the sampling point than would be represented in a sample of the unseparated well fluid. Samples taken by such apparatus, therefore, do not indicate accurately the proportions of oil and water in the liquid which is sampled.

The present invention has for an important object the provision of a method of and apparatus for taking samples of a flowing liquid by which the above disadvantages of the methods and apparatus heretofore commonly employed for this purpose may be overcome by the taking of a continuous sample of a flowing fluid which accurately represents the true condition of the fluid.

Another object of the invention is to provide sample taking apparatus which may be operated to take a continuous sample of a flowing fluid and in which means is embodied for regulating the amount of sample which is taken.

A further object of the invention is the provision of a method of and apparatus for the taking of samples from a flowing stream of liquid which operates by positive displacement of the liquid and wherein the outflow of the sample from the stream takes place at a constant rate, whereby a truly representative sample of the flowing liquid is obtained regardless of changes in viscosity thereof.

FIGURE 6 is a side elevational view on a somewhat reduced scale, showing a somewhat different application of the sample taking apparatus of the invention to fluid metering apparatus; and FIGURE 7 is a side elevational view, similar to that of FIGURE 6 showing the sample taking apparatus as applied to a system in which the apparatus is adapted for continuous operation.

Figure 1:
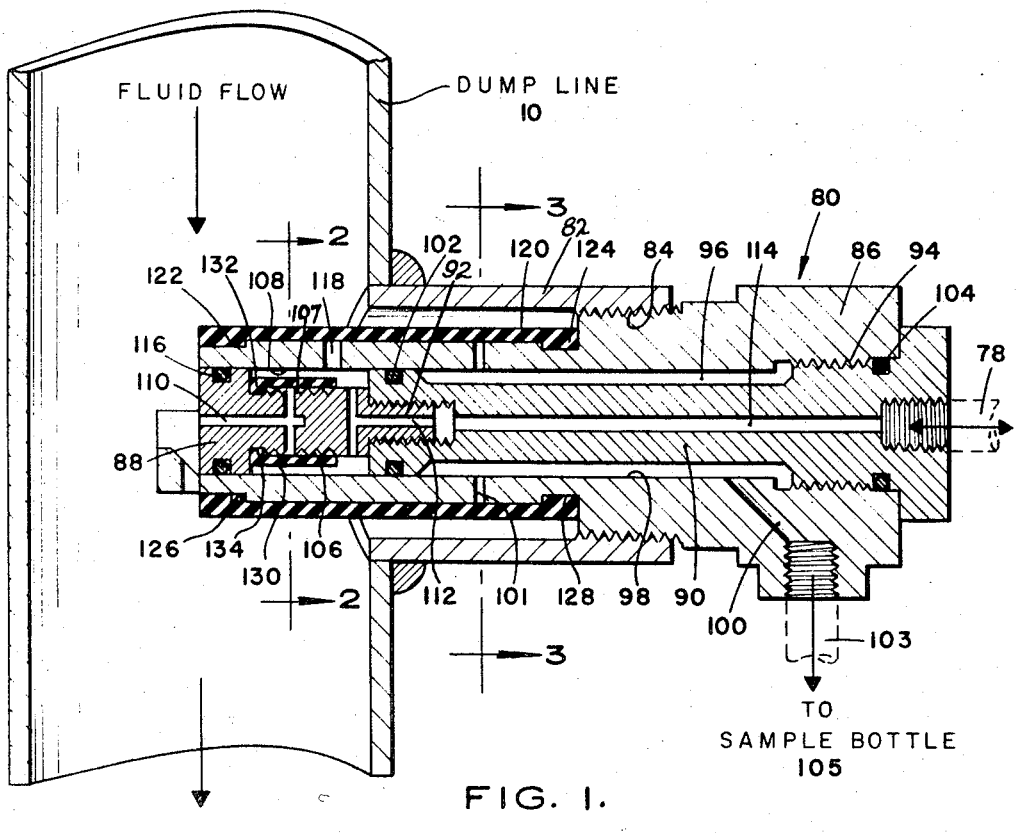
FIGURE 1 is a longitudinal, central, cross-sectional view of the valve mechanism by which the flow of fluid being sampled is controlled, showing the same connected into the flow line from which a sample is to be taken.
Figures 2, 3:
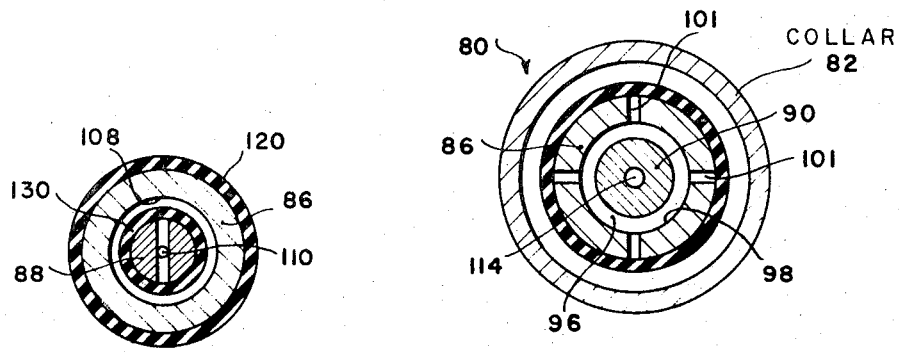
FIGURE 2 is a cross-sectional view, taken along the line 2—2 of FIGURE 1, looking in the direction indicated by the arrows.
FIGURE 3 is a cross-sectional view, taken along the line 3—3 of FIGURE 1, looking in the direction indicated by the arrows.

Referring now to the drawings in greater detail, the sample taking apparatus of the invention is illustrated herein in connection with its use for the withdrawing of a sample of fluid from a flow line, it being understood that the apparatus may also be employed for other purposes where it may be desired to dispense a fluid in accordance with the amount of fluid which flows.

Figure 5:
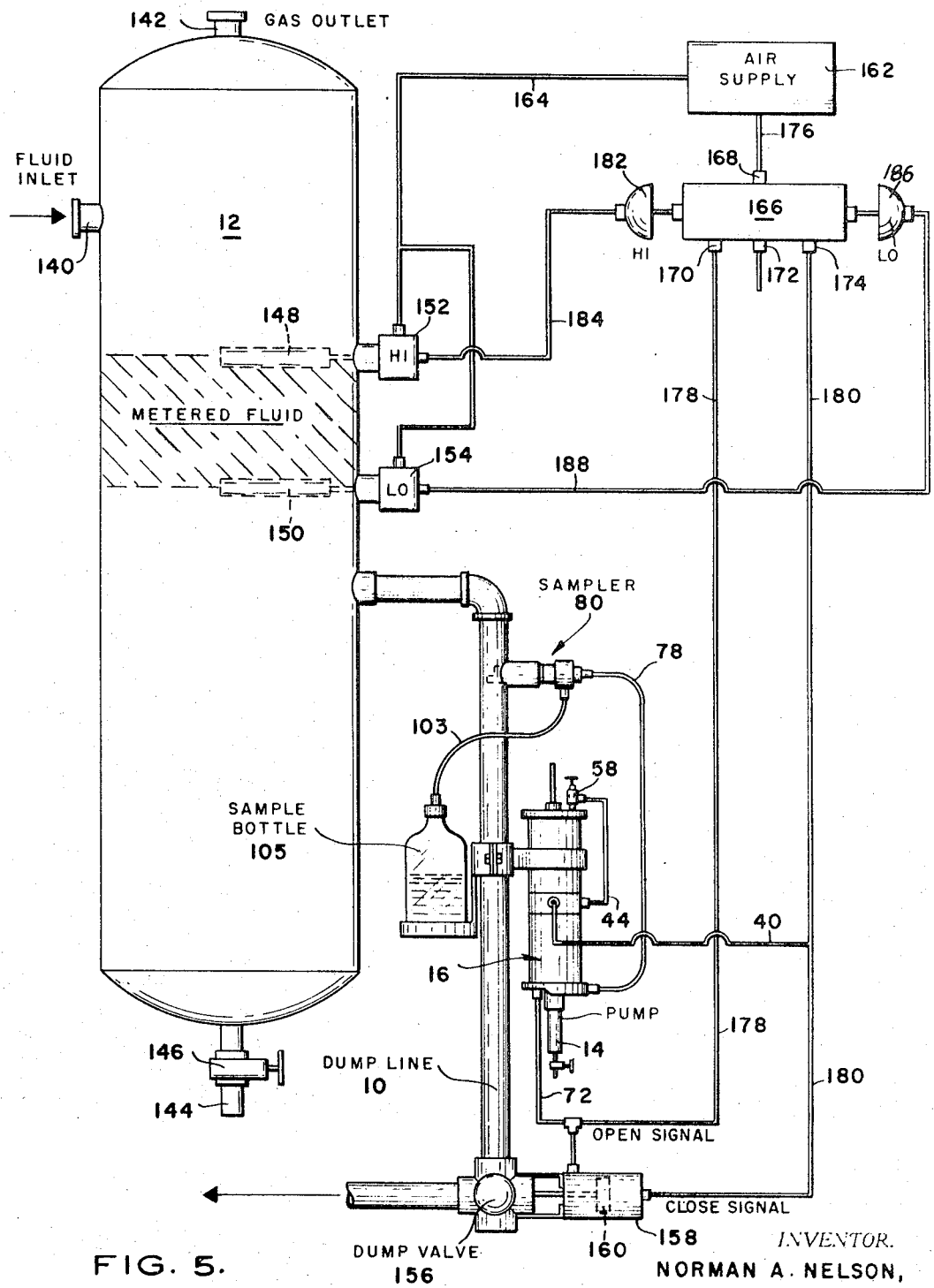
FIGURE 5 is a side elevational view, partly diagrammatic and on a greatly reduced scale, showing the application of the sample taking apparatus of the invention to a fluid metering system for the taking of fluid samples therefrom wherein a sample is taken during each dumping operation and is discharged at the end of each dump.

The invention is illustrated herein in its use for the taking of samples from a flow line 10, such as an oil discharge line from a metering vessel 12 of a metering system, such as that illustrated in FIGURE 5, for measuring the amount of oil obtained from an oil well.

Figure 4:
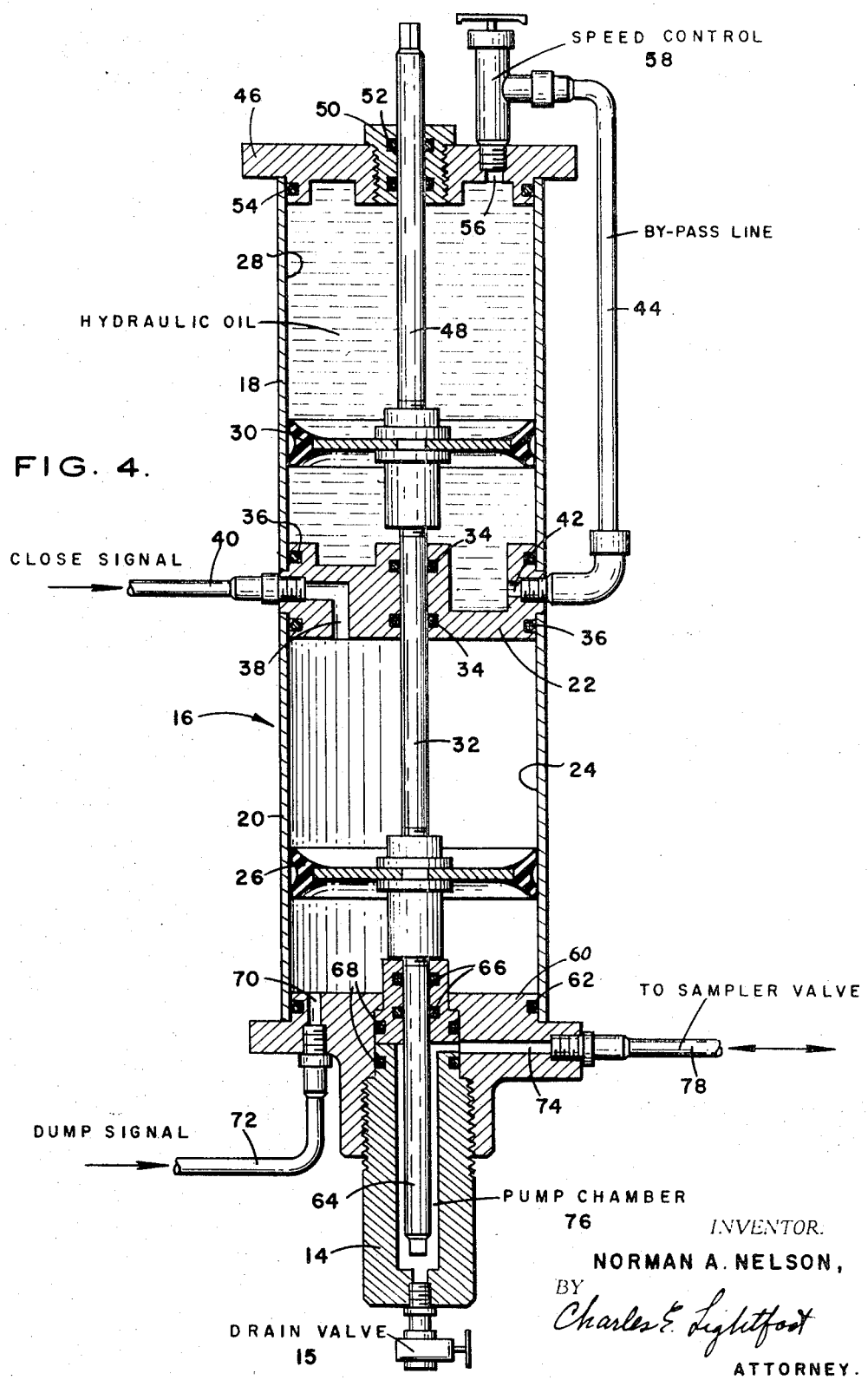
FIGURE 4 is a longitudinal, central, cross-sectional view of the fluid pumping mechanism of the sample taking apparatus of the invention.

The sample taking apparatus includes the fluid pumping mechanism illustrated in detail in FIGURE 4, comprising a pump cylinder 14 and a pump actuating cylinder 16. The actuating cylinder 16 may be formed in tubular sections 18 and 20, suitably connected together, as by means of a connector block 22, to form an actuating chamber 24, within which an actuating piston 26 is movably disposed and a speed control chamber 28, within which a speed control piston 30 is movably disposed, the pistons 26 and 30 being connected together by connecting rod 32, slidably extended centrally through the block 22, which is provided with suitable seal forming means, such as the O-rings 34, forming a fluid tight seal between the block and connecting rod. The block 22 may also be provided with additional seal forming means, such as the O-rings 36, positioned to form fluid tight seals between the block and the sections 18 and 20 of the cylinder 16. The block 22 is formed with an inlet passageway 38, leading into the chamber 24 on one side of the piston 26, and whose inlet end is connected to a pressure fluid line 40, from a suitable source of pressure fluid, and the block is also formed with a passageway 42, through which fluid may flow into and out of the chamber 28 at one side of the piston 30, through a fluid line 44.

The outer end of the section 28 is closed by a closure member 46, through which a central rod 48, connected to the piston 30, is slidable through a bushing 50, provided with a seal forming means, such as O-rings 52 to form a fluid tight seal about the rod. Additional seal forming means such as the O-ring 54 may be provided to form a fluid tight seal between the closure 46 and the tubular section 18. The closure 46 is formed with a passageway 56, through which fluid may flow into and out of the chamber 28 on the other side of the piston 30 through the fluid line 44, under the control of a suitable adjustable valve 58, such as a needle valve. In the operation of the pump mechanism the chamber 28 and fluid-line 44 may be substantially filled with a suitable hydraulic fluid, such as oil.

The tubular section 20 has a closure member 60 at its outer end, which is provided with suitable seal forming means such as the O-ring 62 and through which a central pump plunger 64 connected to the piston 26, is slidably extending into the pump cylinder 14, which is threadably attached to the closure, suitable seal forming means such as the O-rings 66 being provided to form a fluid tight seal between the pump plunger and the closure 60, and the O-rings 68, forming a fluid tight seal between the pump cylinder 14 and the closure.

The closure 60 has an inlet passageway 70, opening into the chamber 24 on the other side of the piston 26 and whose inlet end is connected to a pressure fluid line 72 which may be the same source of pressure fluid to which the pressure fluid line 40 is connected. The closure 60 also has a passageway 74, which opens into the interior of the pump cylinder 14, and through which fluid may flow into and out of the pump chamber 76, through a fluid line 78. The pump cylinder 14 may be provided at its lower end with a drain valve 15 through which fluid from the pump chamber 76 may be drained off when desired.

The sample taking mechanism further includes valve mechanism, generally designated 80, shown in detail in FIGURE 1, which is connected into the flow line 10, through a suitable connection such as collar 82 welded to line 10, and through which fluid may flow to the pump chamber 76 through the fluid line 78, but which prevents the back-flow of fluid from the pump chamber into the flow line.

The valve mechanism 80 includes a valve housing 86, which extends through the collar 82 with its inner end positioned inside the flow line. An inner valve member 88 is threadably connected to spool 90, as indicated at 92, and both are disposed centrally in the housing 86, the part 90 being externally threaded, as shown at 94, for thread- able connection to the internally threaded outer end of the housing 86. The spool 90 has a portion of reduced external diameter mediate its ends, to form an annular chamber 98, between the spool 90 and the housing 86, and the housing is formed with an outlet passageway 100, opening into the chamber 98 and which is connected to the fluid line 103 leading to a suitable sample receptacle 105, and which also communicates with one or more inlet passageways 101, leading into the chamber 98, and which opens to the exterior of the housing 86.

The spool 90 is also provided with suitable seal forming means such as the O-ring 102 to form a fluid tight seal between the housing 86 and the part 90 at one end of the chamber 98, and the O-ring 104, positioned to form a fluid tight seal between the housing 86 and the part 90 at the other end of the chamber 98.

The inner valve member 88 is formed with a portion 106 of reduced external diameter mediate its ends, to form a chamber 108, between the housing 86 and the part 88, and the part 88 has an inlet passageway 110, leading into the chamber 108 and which opens into the interior of the flow line 10, and a passageway 112, leading from the chamber 108 into the central bore 114 of the spool 90, which bore is connected in communication with the line 78 leading to the pump chamber 76. Suitable seal forming means such as the O-ring 116 is provided to form a fluid tight seal between the valve 88 and the housing 86, at one end of the chamber 108, while the seal forming means 102 forms a fluid tight seal at the other end of the chamber 108.

The housing 86 also has an outlet passageway 118 through which fluid may flow out of the chamber 108.

A flexible, elastic, valve sleeve 120, formed of suitable material, such as rubber, neoprene, or the like, surrounds the housing 86 within the collar 82, and extending into the flow line 10, this sleeve being formed at its end with an internal annular, radially, inwardly enlarged end portions 122 and 124, which extend into external, annular recesses 126 and 128, respectively, formed in the housing, to retain the valve sleeve in position thereon.

A second resilient, elastic, valve sleeve 130, formed of similar material, surrounds the reduced portion 106 of the valve 88 in the chamber 108, which sleeve is formed at its outer end with an internal annular, radially inwardly thickened portion 132, extending into an external annular recess 134 and in the valve 88, to retain the sleeve 130 in place.

The sleeve 120, thus extends over the other ends of passageways 118 and 101 of the housing 86, while the sleeve 130 extends over the outlet ends of the passageways 110 of the part 88 and engages the reduced portion 106 about the external ridges 107 of part 88 and in the chamber 108.

In the operation of the above described sample taking pump and valve mechanism the pump plunger 64 will be moved to a retracted position upon the admission of fluid under pressure into the chamber 24 through the pressure fluid line 72, while allowing the discharge of fluid from the chamber 24 through the pressure fluid line 40, and the plunger will be advanced in the pump chamber upon the admission of pressure fluid in the chamber 24 through line 40, while discharging fluid therefrom through line 72. The speed with which the piston 26 moves in the chamber 24 may be suitably regulated by adjusting the valve 58, to control the flow of fluid through the line 44, from one side of the piston 30 to the other side thereof. Upon retracting movement of the plunger 64 fluid from the flow line 10 entering the passageway 110 of the part 88 will expand the inner sleeve 130 to open the passageway and flow into the chamber 108 and will flow from the chamber 108 into the flow line 78 through the passageway 112 and bore 114, supplying fluid from the flow line to the pump chamber.

When the pump chamber has been thus filled with fluid, and the plunger 64 is advanced in the pump chamber by the admission of pressure fluid through line 40 into the chamber 24, while allowing the outflow of fluid therefrom through line 72, pressure is applied to the fluid in the pump forcing the fluid back through the line 78, the pressure of the fluid then holding the inner sleeve 130 in a closed relation to the passageway 110, while expanding the sleeve 120, to allow the flow of fluid from chamber 108 through passageway 118 into the interior of the sleeve 120, and thence out through passageway 101, chamber 98, passageway 100, and line 103, to any desired location to which the sample is to be delivered, such as the receptacle 105.

It will be apparent that by suitably adjusting the valve 58 the speed of movement of the piston 26 may be adjusted to regulate the amount of sample which is taken, so that a relatively large sample may be taken during a relatively short flow of fluid through the flow line 10, or to obtain a very small sample over a relatively long period of flow, as may be desired.

The sample taking apparatus of the invention is particularly suited for use in a metering system such as that illustrated in FIGURE 5, wherein the metering vessel 12 is of the upright or vertically disposed type having an inlet 140 through which oil and gas from a well may be introduced, and an upper end outlet 142 through which gas which separates from the well fluid may escape.

The metering vessel also has a lower end outlet 144 through which water may be drained off under the control of a suitable valve 146.

Within the vessel, upper and lower floats 148 and 150, respectively, are provided, by which the upper and lower float valve assemblies 152 and 154, respectively, are actuated.

The vessel also has the outflow pipe 10 in communication with the interior of the vessel above the bottom of the vessel and below the float valve assemblies 152 and 154 and through which oil may flow out of the vessel under the control of a pressure actuated dumping valve 156.

The valve 156 may be of a pressure operated, motor valve type, having a cylinder 158 within which a piston 160 is disposed, which is connected to the valve to open the same upon the introduction of pressure fluid into the cylinder at one side of the piston while allowing the outflow of fluid therefrom on the other side of the piston, and by which the valve may be closed by introducing pressure fluid to the cylinder on said other side of the piston while allowing outflow therefrom on said one side of the piston.

Pressure fluid for the operation of the system is supplied from any desired source, such as that indicated at 162, from which fluid under pressure is supplied to the valves 152 and 154 through a pipe 164.

The system also has a control or relay valve 166 having ports 168, 170, 172 and 174 and which is constructed for movement to one position to connect the port 168 in communication with port 170 while port 172 is in communication with port 174, or to another position in which port 168 will be in communication with port 174 and port 170 will be in communication with port 172.

Fluid under pressure is supplied to the inlet port 168 of the valve 166 through a pipe 176. The port 170 is connected by a pipe 178 to the cylinder 158 to supply pressure thereto to open the valve 156, while allowing outflow of pressure from the cylinder through a pipe 180 leading to port 174.

Valve 156 is closed, when the relay valve 166 is in a position to supply pressure to pipe 180 while allowing outflow through pipe 178.

The relay valve 166 is of a conventional type having diaphragm mechanism 182, or the like, which is supplied with pressure from pipe 164 through a pipe 184 to move the relay valve to a position to supply pressure to pipe 178 while allowing outflow from pipe 180 to open dumping valve 156, when the control valve 152 is open. Relay valve 166 also has diaphragm mechanism, or the like, 186, which is supplied with pressure from pipe 164 through a pipe 188, upon opening of control valve 154 to move the relay valve to a position to supply pressure to pipe 180 while allowing outflow from pipe 178 to close the dumping valve 156.

Valves 152 and 154 are of a three-way type so that pressure is exhausted from pipe 184 when float 148 is down and pressure is exhausted from 188 when float 150 is up.

Pressure line 40 of the pump actuating cylinder 16 is connected to the pipe 180, and pressure line 72 of the actuating cylinder is connected to pipe 178.

In the operation of the system, the liquid to be metered, such as oil, will accumulate in the vessel 12 until the level rises to cause the float 148 to move upwardly to open control valve 152, thus supplying pressure to relay valve 166 through pipes 164 and 184 to move the relay valve to a position to supply pressure to pipe 178 while allowing outflow from pipe 180. Pressure is thus supplied to cylinder 158 through pipe 178 to open dump valve 156 and at the same time to supply pressure to cylinder 16 through pipe 72 to move piston 26 and plunger 64 upwardly, thus drawing in a sample through pipe 78 during the outflow of liquid from the vessel.

The volume of the sample thus taken will, of course, be determined by the resistance to the flow of liquid through pipe 44 which is regulated by valve 58.

When the liquid in vessel 12 begins to fall, float 148 moves downwardly, closing valve 152. Relay valve 166, however, remains in the same position so that sampling is continued until the level of liquid falls to a point to allow float 150 to move downwardly, opening valve 154 to supply pressure through pipe 188 to move the relay valve 166 to the position to supply pressure to pipe 180 while allowing outflow from pipe 178, whereupon pressure is supplied to cylinder 158 through pipe 180 to close the dumping valve 156 and supply pressure to cylinder 16 through pipe 40 while allowing outflow therefrom through pipe 72 to move piston 26 and plunger 64 downwardly, thus discharging the sample through line 78, valve 80 and line 103 to sample receptacle 105.

The valve 58 may, of course, be of a type which opens fully to permit rapid backflow of liquid through line 44 to allow piston 30 to move quickly downwardly during the discharge of the sample but which may be regulated to restrict the flow of liquid through line 44 upon upward movement of piston 30 to regulate the amount of sample which is taken.

A somewhat modified form of the sample taking mechanism of the invention is illustrated in FIGURE 6, wherein the sample taking pump and actuating cylinder are of the same construction as previously described, but wherein the pressure for operation of the same comes from a constant pressure source without the intermediation of the relay valve with the upper and lower control valve mechanisms by which the position of the relay valve is shifted.

In this modification of the invention actuating pressure for operation of the sample taking cylinder is supplied from the constant pressure source through a pipe 192 under the control of a toggle valve 194, having an inlet in communication with a pipe 40', leading into the actuating chamber 24 above the piston 26, while pressure from the same source may be supplied through a pipe 72' to the lower end of the actuation chamber under the control of a float actuated control valve, not shown, similar to the valve 152 operated by a float 148 in a metering vessel, similar to the vessel 12.

The toggle valve 194 is of a type having an exhaust port 196 through which pressure may flow out of pipe 40' when the valve is in pressure exhausting position. The toggle valve has a lever 198 by which the valve is moved to pressure supplying position when the lever is moved upwardly and to pressure exhausting position when the lever is moved downwardly.

A trigger arm 200 is attached to the lever 198, which arm has a lower end lug 202 positioned to be engaged by a knob 204 on the upper end of the shaft 48′ of the sample taking cylinder mechanism to snap the lever 198 to its down or pressure exhausting position upon downward movement of the pistons 26 and 30. The knob 204 is also positioned to engage the outer end of the lever 198 upon upward movement of the shaft 48′ to snap the lever to its up or pressure supplying position.

This form of the invention has the same sample taking valve mechanism illustrated in FIGURE 1, which operates in the same manner as previously described.

In the operation of this form of the invention, the float in the metering vessel is moved upwardly when the level of liquid rises above a predetermined level to open the control valve, similar to valve 152 to admit pressure to the line 72′, the toggle valve 194 being then in pressure exhausting position to allow outflow of pressure from pipe 40′ through exhaust port 196, whereupon the piston 26 is moved upwardly to draw in a sample through pipe 78. At the end of a dump cycle, the valve 152 will be closed when the level of liquid in the vessel falls to a predetermined level. When the level of the liquid again rises in the vessel above to open valve 152, pressure will again be supplied to the cylinder 16 to cause the taking of an additional sample during the next dumping cycle. Successive samples are thus taken until the knob 204 engages the lever 198 to move the toggle valve 194 to its pressure supplying position, closing exhaust port 196 and supplying pressure through pipe 40′ to move piston 26 downwardly to discharge the composite sample.

When the composite sample has been discharged, the knob 204 will engage the lug 202 of slide arm 200 to move the lever 198 downwardly to move toggle valve 194 to its pressure exhausting position, so that upon the next application of pressure through pipe 72′ a further sample will be taken during the next dumping cycle.

A further modified form of the sample taking mechanism of the invention is illustrated in FIGURE 7, which is particularly suited to the taking of samples from a continuously flowing stream, such as a pipe line through which liquid is flowing constantly.

The sample taking pump and its actuating cylinder mechanism 16 in this instance are the same as previously described, and the same type of toggle valve 194 and actuating mechanism for the same are employed as described in connection with the form of the invention illustrated in FIGURE 6. The sample taking valve mechanism of FIGURE 1 is also employed in this modification of the apparatus.

In this modification of the invention the sample taking apparatus is operated by pressure from any convenient source supplied through a pipe 192′ which is connected to a pipe 72″ which leads to the lower end of the actuating chamber 24 of the sample taking apparatus under the control of a normally open 3-way valve 210 having an exhaust port 212 which is closed when pressure is being supplied through pipe 72″ to actuating cylinder 16 beneath piston 26 but which is open to allow the escape of pressure from cylinder 16 beneath piston 26 when the valve 210 is in closed position. A pipe 40″ is connected to the toggle valve 194 through which pressure is supplied to the upper end of the actuating chamber 24, when the toggle valve lever 198 is in its up position and from which pressure is exhausted through the toggle valve when the lever 198 is in its down position. The valve 210 may be of a usual type which is designed to be closed by pressure supplied to an actuating cylinder 214 from pipe 40″ to allow the exhaust of pressure from beneath pistons 26 in cylinder 16 when the toggle valve 194 is in position to supply pressure from pipe 192′ to pipe 40″, and to be opened to supply pressure to the lower end of chamber 24 when the toggle valve is in the position to exhaust pressure from pipe 40″.

The supply of fluid from the constant source through 192′ may be controlled by any suitable means to cut off the supply of pressure therethrough when there is no flow of the fluid to be sampled and to supply pressure through pipe 192′ when the fluid to be sampled is flowing.

The sample taking apparatus of FIGURE 7 needs no control valve mechanism such as that described in connection with the previously described forms of the invention, since the apparatus operates continuously to take samples from a continuously flowing stream.

In the operation of this modification of the invention pressure from pipe 192′ is supplied to the lower end of chamber 24 through pipe 72″ when the toggle valve lever 198 is down, the toggle valve being then in position to exhaust pressure from pipe 40″ to allow the piston 26 and the plunger 64 therewith to move upwardly to draw in a sample of fluid through pipe 78. Such taking of the sample continues until the knob 204 engages the outer end of the lever 198 to move the same to its up position, thus snapping the toggle valve to a position to supply pressure to pipe 40″ and move valve 210 to a position to shut off pressure from the lower end of chamber 24 and allow outflow of fluid therefrom through pipe 72″, whereupon the piston 26 and plunger 64 will be moved downwardly to discharge the sample. As soon as the knob 204 engages lug 202, the toggle valve will again be snapped to a position to supply pressure through pipe 72″ to the lower end of chamber 24 while allowing exhaust of pressure from the upper end of the same through pipe 40″ to begin the further withdrawal of sample from the stream.

It will be apparent from the above description of the apparatus of the invention and its manner of operation that the method of the invention comprises the withdrawal of a sample from a flowing stream of liquid by positive displacement whereby the withdrawal of liquid takes place at a constant rate regardless of variations in the viscosity or consistency of the liquid.

In the form of the apparatus illustrated in FIGURE 5, in which the outflow of liquid is intermittent and wherein the outflowing liquid will vary substantially in viscosity because of the separate dumping of the water and oil components, the method further comprises the withdrawal of sample liquid from the stream at a constant rate during the outflow of liquid and the cessation of such withdrawal upon cessation of the outflow. Thus, upon the occurrence of each successive period of outflow a sample of the liquid is taken at a constant rate during outflow and the sample taking operation is suspended during the intervals between the successive outflow periods.

In the form of the apparatus of the invention illustrated in FIGURE 6, the outflow of liquid in the stream takes place during intermittent periods upon filling of the metering vessel regardless of whether the separation of oil and water is complete, so that the outflowing stream may vary considerably in consistency and the method in this case is the same as previously described in connection with the apparatus of FIGURE 5.

The apparatus illustrated in FIGURE 7 is intended for use in obtaining samples of liquid from a constantly flowing stream and the method in such case comprises the withdrawal of the sample from the stream at a constant rate during a predetermined period of time and the subsequent delivering of the sample so obtained to a sample receiver.

It will thus be seen that the invention provides a method of taking samples of a flowing liquid and apparatus for carrying out such method embodying sample pumping mechanism and valve means therefor having improved construction and operation characteristics, and by which accurately representative samples may be obtained.

Having thus clearly shown and described the invention, what is claimed as new and desired to secure by Letters Patent is:

1. Apparatus for taking a sample of liquid from a source in which liquid flows intermittently comprising, a reciprocating pump, means connecting said pump in communication with said source to supply liquid to the pump during actuation of the pump in one direction, means connecting the pump in communication with a sample receiver to supply liquid from the pump to the receiver during actuation of the pump in the other direction, means for actuating the pump in said one direction in response to a signal causing the flow of said liquid in said source, fluid means connected to said pump for yieldingly resisting actuation of the pump in said one direction and means for actuating said pump in said other direction in response to a signal causing the cessation of such flow.

2. Apparatus for taking a sample of liquid from a source comprising, a reciprocating pump having a predetermined stroke, means for supplying liquid from said source to the pump during actuation of the pump in one direction of its stroke, means for supply liquid from the pump to a sample receiver during actuation of the pump in the other direction, means for actuating the pump, and fluid means connected to the pump for yieldingly resisting actuation of the pump in said one direction and means for varying the resistance of said fluid means to such actuation of the pump in said one direction to control the rate of actuation of the pump in said one direction.

3. Apparatus for taking a sample of liquid from a source in which liquid flows intermittently comprising, a pressure fluid actuated reciprocating pump, means connecting the pump in communication with said source to supply liquid to the pump during actuation of the pump in one direction, means connecting the pump in communication with a sample receiver to supply liquid from the pump to the receiver during actuation of the pump in the other direction, means for supplying pressure fluid to the pump to actuate the pump and means for controlling the supply of such pressure fluid to actuate the pump in said one direction during the flow of liquid in said source and to actuate the pump in said other direction upon cessation of such flow, fluid means connected to said pump for yieldingly resisting actuation of the pump in said one direction.

4. In apparatus for taking a sample of liquid from a source, the combination with a reciprocating pump, inlet means connecting the pump in communication with said source to supply liquid to the pump during actuation of the pump in one direction, outlet means connecting the pump in communication with a sample receiver to supply liquid from the pump to the receiver during actuation of the pump in the other direction, and means for actuating the pump; of valve means for controlling the flow of liquid through said inlet means and outlet means, said valve means having a passageway formed with an inlet in communication with said source and with said inlet means and also having an outlet through which liquid may flow from said passageway, fluid within said inlet means and said outlet means being under pressure controlled by said pump, and means exposed at all times to the pressure of the liquid to be sampled and the pressure of said fluid for opening the inlet and closing the outlet in response to a difference in pressure between such liquid and such fluid when the pressure of such fluid falls below the pressure of such liquid during actuation of the pump in said one direction and for opening the outlet and closing the inlet in response to a difference in pressure between such liquid and such fluid when the pressure of such fluid exceeds the pressure of such liquid during actuation of the pump in the other direction.

5. In apparatus for taking a sample of liquid from a source, the combination with a reciprocating pump, inlet means connecting the pump in communication with said source of supply liquid to the pump during actuation of the pump in one direction, outlet means connecting the pump in communication with a sample receiver to supply liquid from the pump to the receiver during actuation of the pump in the other direction, and means for actuating the pump, of valve means for controlling the flow of liquid through said inlet means and outlet means, said valve means having an outer cylindrical shell and an inner cylindrical housing shaped to form between them an enclosed chamber, said housing having a passageway formed with an inlet opening to the exterior of the housing in communication with said source and through which liquid may flow to and from said pump and said shell having longitudinally spaced ports opening to the exterior of the shell, one in communication with said passageway and the other in communication with said chamber, a sleeve formed of resilient material surrounding said housing in closing relation to said inlet in position for actuation to open said inlet in response to a decrease in pressure in said passageway, and a sleeve formed of resilient material surrounding said shell in closing relation to said ports in position for actuation to open said ports to allow the flow of fluid therethrough from the passageway into said chamber in response to an increase in the pressure in said passageway.

6. Apparatus for taking a sample of liquid from a source in which liquid flows intermittently, comprising a reciprocating pump, means for supplying liquid from said source to the pump during actuation of the pump in one direction and for supplying liquid from the pump to a sample receiver during actuation of the pump in the other direction, a pump actuating cylinder, a piston movably disposed in the cylinder, means forming a connection between the piston and pump to actuate the pump upon movement of said piston, a source of fluid under pressure, means responsive to a signal causing the flow of liquid in said source of liquid for supplying fluid under pressure from said source of fluid to one end of the cylinder and allowing outflow from the other end of the cylinder to actuate the pump in said one direction and responsive to a signal causing the cessation of the flow of liquid in said source for supplying fluid under pressure from said source of fluid to said other end of the cylinder while allowing outflow from said one end of the cylinder to actuate the pump in said other direction, and means for controlling the rate of actuation of said pump in said one direction.

7. Apparatus for taking a sample of liquid from a source, comprising a reciprocating pump, means for supplying liquid from said source to the pump during actuation of the pump in one direction and for supplying liquid from the pump to a sample receiver during actuation of the pump in the other direction, a pump actuating cylinder, a piston movably disposed in the cylinder, means forming a connection between the piston and pump to actuate the pump upon movement of said piston, a source of fluid under pressure, and means for supplying fluid under pressure from said source to one end of the cylinder and allowing outflow from the other end of the cylinder to actuate the pump in said one direction and for supplying fluid under pressure from said source to the other end of the cylinder while allowing outflow from said one end thereof to actuate the pump in said other direction, a control cylinder, a control piston movably disposed in the control cylinder, means forming a connection between the actuating piston and control piston to cause the pistons to move together, said control cylinder being substantially completely filled with liquid, means for conducting liquid in the control cylinder from one side to the other side of the piston therein and means for restricting the flow of liquid through said conducting means in a direction to yieldingly resist actuation of said pump in said one direction.

8. Apparatus for taking a sample of liquid from a source in which liquid flows intermittently comprising, a reciprocating pump, means connecting said pump in communication with said source to supply liquid to the pump during actuation of the pump in one direction, means connecting the pump in communication with a sample receiver to supply liquid from the pump to the receiver during actuation of the pump in the other direction, means for actuating the pump in said one direction in response to a signal causing flow of said liquid in said source, fluid means connected to said pump for yieldingly resisting actuation of said pump in said one direction and means for actuating said pump in said other direction in response to a predetermined actuation of the pump in said one direction.

References Cited

UNITED STATES PATENTS

| | | | |
|---|---|---|---|
| 2,192,325 | 3/1940 | Nelson | 103—50 |
| 2,794,344 | 6/1957 | Boren | 73—422 |
| 2,927,465 | 3/1960 | Smith | 73—422 |
| 2,995,931 | 8/1961 | Perry et al. | 73—422 X |
| 3,090,323 | 5/1963 | Smith | 73—422 |
| 3,229,527 | 1/1966 | Johnson | 73—422 |
| 3,390,580 | 7/1968 | Taylor | 73—422 |

S. CLEMENT SWISHER, Primary Examiner